United States Patent
Busch et al.

(10) Patent No.: US 7,523,668 B2
(45) Date of Patent: Apr. 28, 2009

(54) DEVICE FOR PERFORMING VIBRATION MEASUREMENTS ON A TEST PART HAVING AT LEAST ONE ROTOR, ESPECIALLY A TRANSMISSION

(75) Inventors: Klaus-Joachim Busch, Nienhagen (DE);
Joakim Kühl, Hodenhagen (DE);
Andreas Eicke, Isernhagen-HB (DE)

(73) Assignee: ThyssenKrupp EGM GmbH, Langenhagen (DE)

( * ) Notice: Subject to any disclaimer, the term of this patent is extended or adjusted under 35 U.S.C. 154(b) by 0 days.

(21) Appl. No.: 11/588,287

(22) Filed: Oct. 27, 2006

(65) Prior Publication Data

US 2007/0044555 A1   Mar. 1, 2007

Related U.S. Application Data

(63) Continuation of application No. PCT/EP2005/009240, filed on Aug. 26, 2005.

(51) Int. Cl.
*G01N 29/00* (2006.01)
(52) U.S. Cl. .............................. 73/649; 73/460; 73/462; 73/580
(58) Field of Classification Search ................... 73/649, 73/457, 462, 469, 470, 471, 571, 575
See application file for complete search history.

(56) References Cited

U.S. PATENT DOCUMENTS

| | | | | |
|---|---|---|---|---|
| 4,278,031 A * | 7/1981 | Dangschat | ...................... | 108/4 |
| 5,641,904 A * | 6/1997 | Kopp et al. | ................... | 73/457 |
| 5,821,424 A * | 10/1998 | Rodriguez | ................... | 73/657 |
| 5,871,314 A * | 2/1999 | Trionfetti | ..................... | 409/165 |
| 5,877,420 A | 3/1999 | Moradi et al. | | |
| 6,694,812 B2* | 2/2004 | Loetzner et al. | ............... | 73/462 |
| 7,314,313 B2* | 1/2008 | Rogalla et al. | .............. | 384/117 |
| 2003/0024309 A1* | 2/2003 | Loetzner et al. | ............... | 73/462 |
| 2007/0194637 A1* | 8/2007 | Childe et al. | ................... | 310/51 |

FOREIGN PATENT DOCUMENTS

| | | |
|---|---|---|
| DE | 1 937 865 | 1/1971 |
| DE | 2 039 889 | 4/1971 |
| DE | 30 11 110 A1 | 10/1981 |
| DE | 35 38 229 A1 | 4/1987 |
| DE | 35 38 229 C2 | 7/1987 |
| DE | 39 05 983 A1 | 8/1990 |
| DE | 3903814 A1 | 8/1990 |
| DE | 100 37 412 A1 | 3/2002 |
| DE | 102 34 022 A1 | 2/2004 |
| WO | 02/23149 A1 | 3/2002 |
| WO | 03/062766 A1 | 7/2003 |

* cited by examiner

*Primary Examiner*—Hezron Williams
*Assistant Examiner*—J M Saint Surin
(74) *Attorney, Agent, or Firm*—Shlesinger, Arkwright & Garvey LLP

(57) ABSTRACT

A device according to the invention for performing vibration measurements on a test part that has a rotor, especially a transmission, includes a base structure, on which a fastening device for the test part is arranged, and a vibration measuring device for measuring vibrations caused by a rotation of the rotor of the test part. According to the invention, a balancing device is provided, arranged on the base structure or at least partially integrated into the base structure, for identifying and/or eliminating an imbalance in the rotor. The device of the invention thus enables both a balancing of the rotor and the performance of vibration measurements on the rotor, using a single device.

31 Claims, 3 Drawing Sheets

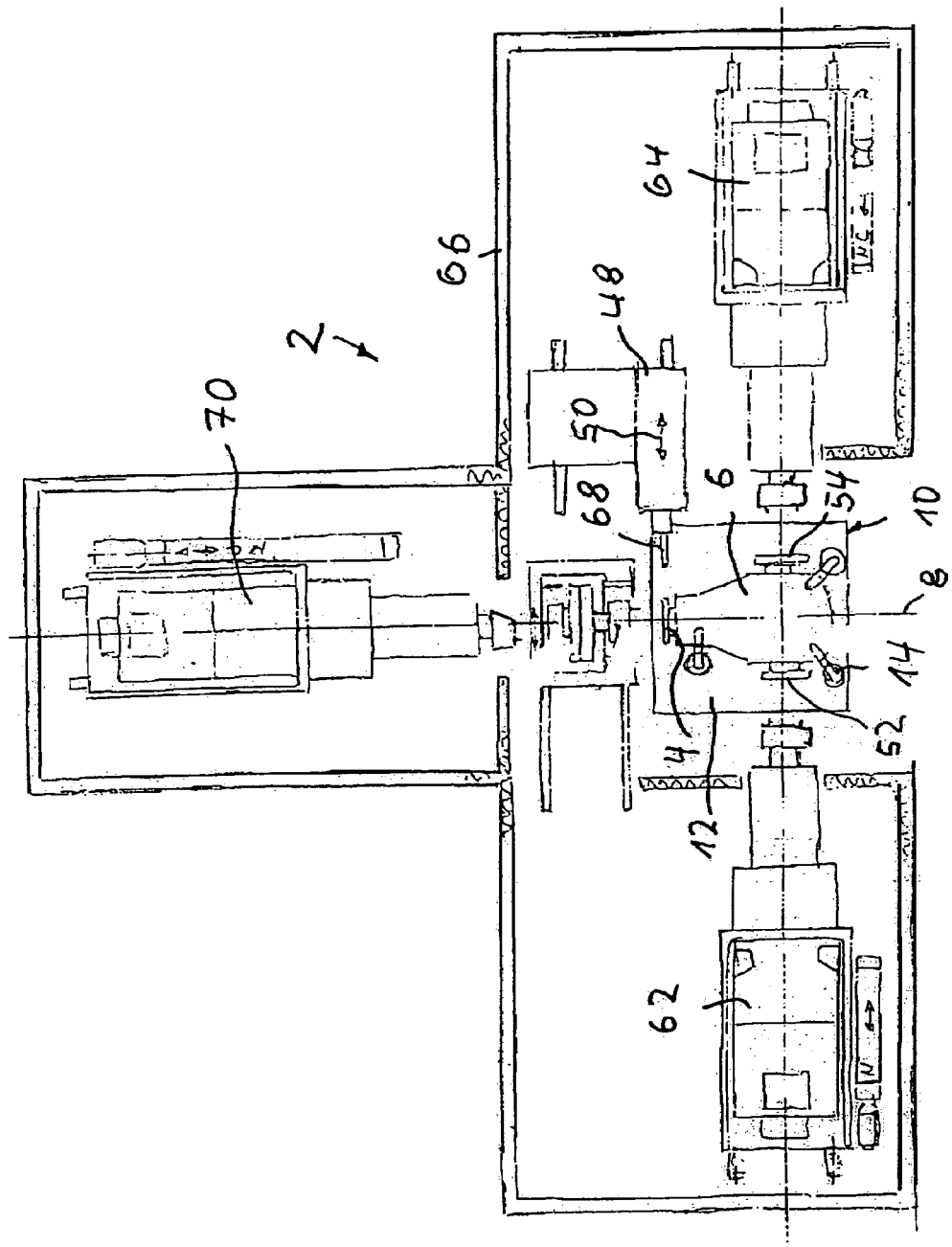

DEVICE FOR PERFORMING VIBRATION MEASUREMENTS ON A TEST PART HAVING AT LEAST ONE ROTOR, ESPECIALLY A TRANSMISSION

CROSS-REFERENCE TO RELATED APPLICATIONS

This application is a continuation of application No. PCT/EP2005/009240, filed Aug. 26, 2005, and which is incorporated herein by reference.

FIELD OF THE INVENTION

The invention relates to a device for performing vibration measurements on a test part which has at least one rotor. More particularly, the invention relates to a device for performing vibration measurements on a test part which has at least one rotor, and which is especially suited for a transmission.

BACKGROUND OF THE INVENTION

Devices of this type are known in the prior art as components of test stands, for example from DE 39 05 983 A1, DE 100 37 412 A1, and DE 102 34 022 A1. They are used, for example, to perform functional testing on test parts, such as transmissions, wherein the rotor of the test part is rotated by an external drive, and the resulting vibrations are recorded. By evaluating the recorded vibrations, it can then be determined whether the test part is functioning properly or whether functional defects are present. The prior art devices include a base structure on which a device for securing the test part in place is arranged, and a vibration measuring device for measuring vibrations caused by a rotation of the rotor of the test part during a test process.

OBJECTS AND SUMMARY OF THE INVENTION

An object of the invention is to overcome the drawbacks of the prior art.

Another object of the invention is to provide a device by which the testing of test parts by performing vibration measurements is made faster and more efficient.

This object is achieved with a device for performing vibration measurements on a test part which has at least one rotor, and which is especially suited for a transmission.

This object is likewise achieved with a device configured for performing vibration measurements on a test part having at least one rotor, the device including a base structure including a base, a table provided on the base structure, and a fastening device configured for fastening the test part, in use, mounted on the table. A vibration measuring device is provided and configured for measuring vibrations caused by a rotation of the rotor of the test part, in use. A balancing device provided, the balancing device being one of arranged on the base structure and at least partially integrated into the base structure, and the balancing device being configured for at least one of identifying and eliminating an imbalance in the rotor of the test part, in use. The table includes a vibration table connected to the base of the base structure, and the vibration table is capable of vibrating. The vibration table is elastically and resiliently mounted on the base via a spring device.

The fastening device may include a clamping fixture for holding the test part in place, in use.

The inventive device may likewise include that the vibration table is pivotably connected for moving around at least one articulation axis relative to the base of the base structure.

The basic idea of the teaching of the invention includes using a device according to the invention not only to perform vibration measurements on the test part, but also to balance the test part, especially before the vibration measurements are performed. In general it is necessary to balance the test part before performing vibration measurements because imbalances in the rotor of the test part could give erroneous test results, besides making them unusable. Furthermore, a balancing of the test part may be indispensable to its defect-free functioning.

To accomplish this, according to the invention, a balancing device for detecting and/or eliminating any imbalance in the rotor is provided, arranged on the base structure or at least partially integrated into the base structure. According to the invention the rotor of the test part can be both balanced and subjected to vibration measurements using one and the same device. Since only a single device is required for performing these processes, the instrumentation expenditure for balancing and testing a test part is decreased substantially over conventional devices. Because the balancing device is arranged on the base structure or is at least partially integrated into the base structure, a separate balancing machine is no longer necessary. This results in a significant cost savings.

A further advantage of the device according to the invention includes that the balancing and testing of test parts is made substantially more efficient, since the balancing and the performance of vibration measurements can take place without the test part having to be removed from the fastening device of the device according to the invention. Thus the test part can remain in the fastening device both during the balancing process and during the performance of vibration measurements. In this way, the additional processing steps of removing the test part from a fastening device in a balancing machine and placing the test part in a fastening device in a test stand are omitted. Consequently, according to the invention, labor costs are especially reduced when the loading of the fastening device with the test part and the removal of the test part from the fastening device are performed by hand.

A further advantage of the device according to the invention includes that its manufacturing costs are reduced substantially relative to conventional arrangements that consist of a separate balancing machine and a separate device for performing vibration measurements.

With the balancing device of the invention, which is arranged on the base structure or is at least partially integrated into the base structure, it is first determined whether there is an imbalance in a rotor of a test part. If it is determined in this process that an imbalance exists, this imbalance is then eliminated or reduced, within the scope of preset tolerances, by the balancing device. If, in contrast, the test establishes that the test part has no imbalance, or has a negligible imbalance, then an elimination of an imbalance is unnecessary. In that case a vibration measurement can be performed on the test part immediately and without a preceding balancing step.

In order to obtain a stable mechanical structure that will be influenced by external vibrations to the lowest possible degree, a further embodiment in accordance with the teaching of the invention includes that the base structure has a table on which the fastening device for the test part is mounted.

The fastening device for securing the test part in place during the balancing process and the vibration measurement process can be selected on the basis of relevant requirements. In this connection, one advantageous further development of the teaching of the invention provides that the fastening device has a clamping fixture for clamping the test part. With the clamping fixture, placement of the test part in the fastening device and removing the test part from the fastening device are substantially simplified, and thus are configured to be more timesaving.

An exceptionally advantageous further development of the teaching of the invention provides that the table is configured as a vibration table, and is connected to a base of the base structure such that it is capable of vibrating, especially it is supported on said base. In this embodiment, the table is mounted on the base such that it is capable of vibrating, and can be placed in vibration by the rotor of the test part. The measurement and evaluation of the vibrations of the vibration table then especially provides for determining whether or not an imbalance exists in the rotor of the test part. For example, the vibration table can be suspended in a frame-like base of the base structure, and can be supported on the base via springs, for example coil springs, the outer peripheries of which extend up to the frame-like base. When the vibration table vibrates, the springs are then compressed or expanded in the direction of vibration.

One advantageous further development of the above embodiment provides that the vibration table is flexibly mounted on the base via a spring device, such that it is capable of moving around at least one articulation axis. In this embodiment a vibration mounting of the vibration table with a particularly simple mechanical construction results.

In the above embodiment, the spring device can be selected from a wide range of choices. One particularly advantageous further development of the teaching of the invention provides that the spring device includes at least one leaf spring, wherein an articulation axis is formed in each of the areas in which the leaf springs attach to the table and to the base. Leaf springs of this type are available as simple and cost-effective standard components, with spring constants that vary within broad ranges, thus allowing the device of the invention to be configured to meet relevant requirements in a simple manner. Furthermore, leaf springs of this type are relatively cost-effective.

The form, size, number and spring constants of the leaf spring or leaf springs can be selected from within a wide range. One advantageous further development of the teaching of the invention provides that four leaf springs are provided, spaced relative to one another, which are preferably arranged at the corner points of a rectangle. With this embodiment a statically determinate mounting of the vibration table on the base, on the one hand, and a high degree of stability of the device, on the other hand, are achieved.

The rotational axis of the rotor of the test part can, in principle, have any orientation relative to the articulation axis or the articulation axes, as long as a rotation of the rotor places the vibration table in vibration to a degree that is necessary for detecting imbalances. To facilitate an excitation of the vibration table with respect to vibrations caused by an imbalance in the rotor, one advantageous further development of the teaching of the invention provides that the fastening device is arranged relative to the articulation axis or the articulation axes in such a way that when a test part is placed in the fastening device, the rotational axis of its rotor is substantially parallel to the articulation axis or the articulation axes.

Another exceptionally advantageous further development of the teaching of the invention provides that the characteristic frequency of a vibration arrangement formed by the vibration table and the spring device is chosen to be higher than a maximum vibrating frequency for the test part, which is established by a maximum speed of its rotor during the testing process. In this manner, the vibration arrangement is prevented from becoming excited by its characteristic frequency during the testing process, which could lead to erroneous test results and could damage or even destroy the device.

Another advantageous further development of the teaching of the invention provides that the vibration measuring device has at least one vibration sensor, which is or can be placed in vibration-transmitting connection with the test part. With this vibration sensor, which is allocated to the vibration measuring device, vibrations of the test part can be detected and evaluated during a testing process.

Another advantageous further development of the teaching of the invention provides that the balancing device has at least one vibration sensor, which includes a vibration-transmitting connection with the vibration table. The vibration sensor that is allocated to the balancing device serves to detect vibrations of the vibration table, and an evaluation of the output signal from the vibration sensor provides, for example and especially, conclusions to be drawn regarding an imbalance in the rotor or one of the rotors of the test part.

Another advantageous further development of the teaching of the invention provides that the vibration sensor is a contactless working sensor, with further developments of this embodiment providing that the vibration sensor is configured as a laser vibrometer or as an acoustic sensor.

Another advantageous further development of the teaching of the invention provides that the vibration sensor is a contacting sensor. According to one advantageous further development, the vibration sensor can be attachable or is attached to the test part. In this manner, vibrations of the test part are detected directly on the test part, so that disruptive interferences caused by vibrations not originating from the test part are decreased or prevented. The precision of the test results is thereby improved. In this process, the vibration sensor can be attached to the test part, for example it can be adhered to the test part. However it is also possible, according to the invention, to arrange the vibration sensor on a fastening device that is movable relative to the test part. For example, the vibration sensor can be connected to a pneumatic cylinder, and can be placed in contact with the test part via the pneumatic cylinder for the purpose of performing vibration measurements, and once the vibration measurements have been completed it can be taken out of contact with the test part. In order to ensure constant contact between the vibration sensor and the test part in such an embodiment, the vibration sensor can be biased against the test part via a spring device.

One advantageous further development of the embodiments having the contacting sensor provides that the vibration sensor is configured as an acceleration sensor. Acceleration sensors of this type are available as simple and cost-effective standard components, and are relatively cost-effective.

In principle, a sensor that is allocated to the vibration measuring device can be arranged on the table of the base structure. In order to simplify the mechanical configuration of the device of the invention, one advantageous further development of the teaching of the invention provides that the vibration sensor is supported against a spring of the spring device, especially against a leaf spring. In this manner, the vibration sensor can especially be supported against a part of the spring that undergoes the greatest possible displacement during a vibration of the vibration table. A precise recording of vibrations of the vibration table is thereby facilitated.

A further development of the above-described embodiments provides that the vibration sensor is mounted on a fastening device that is arranged below the vibration table. In this embodiment, the vibration sensor is arranged beneath the vibration table. Because the space beneath the vibration table is ordinarily open anyway, the utilization of available space is thereby improved.

In order to keep the vibration sensor in constant contact with the spring during a displacement of said spring, one advantageous further development provides that the vibration sensor is flexibly biased against the spring of the spring device.

The form, size, number and configuration of the vibration sensors may be selected based upon relevant requirements, from a wide range of choices. One advantageous further development of the teaching of the invention provides that at least one separate vibration sensor is allocated to the vibration measuring device and to the balancing device, respectively. This embodiment has the advantage that the vibration sensors can be adjusted/suited to the relevant recording task; namely, the sensor that is allocated to the balancing device for recording of vibrations characteristic of an imbalance in the rotor, and the vibration sensor that is allocated to the vibration measuring device for recording of vibrations characteristic of the functioning of the test part, are selected based on their suitability and characteristics.

Another advantageous further development of the teaching of the invention provides that at least one common vibration sensor is allocated to the vibration measuring device and the balancing device. Thus in this embodiment, both vibrations that characterize an imbalance and vibrations that characterize the functioning of the test part are picked up by one and the same sensor. In this manner, the structural expenditure is further reduced, as essentially only one vibration sensor is required.

Another advantageous further development of the teaching of the invention provides for a control device for the preferably automatic activation of the vibration measuring device and the balancing device and/or evaluation device for evaluating output signals from the vibration sensor or the vibration sensors. With the control device, for example and especially, control processes for activation of the balancing device and the vibration measuring device can be automatically executed.

One exceptionally advantageous further development of the above-described embodiment provides that once a rotor of a test part has been balanced by the balancing device, with the device in the balancing mode, the device can be automatically switched over by the control device to a testing mode, in which vibrations caused by a rotation of the rotor of the test part can be measured by the vibration measuring device. In this embodiment, with the device according to the invention, the rotor of the test part can first be balanced in the balancing mode. Once the rotor of the test part has been balanced, the device is automatically switched over by the control device to the testing mode, in which vibration measurements are performed on the test part. Because the balancing process and the testing process can thus be performed in immediate succession, this embodiment results in a further time savings.

Balancing, according to the invention, also involves a process in which it is determined whether the test part has no imbalance or has an imbalance that lies below prescribed limits, and accordingly a treatment of the rotor of the test part configured to eliminate the imbalance is not necessary.

Another further development of the embodiment with the control device provides that a vibration sensor that is allocated to the balancing device includes a signal-transmitting connection with the control device, such that, in order to balance the rotor of the test part, the control device generate control signals to activate the balancing device on the basis of the output signals from the vibration sensor which is allocated to the balancing device. With this embodiment, by evaluating the output signals from the vibration sensor, for example, it can be determined at what point (imbalance point) on the periphery of the rotor of the test part an imbalance exists. The control device can then generate control signals for activating the balancing device, which then processes the rotor to eliminate or reduce the imbalance at a balancing point by, for example, applying an amount of weight that is required to eliminate or reduce the imbalance, or by removing material from the rotor of the test part.

Another advantageous further development of the teaching of the invention provides that a vibration sensor that is allocated to the vibration measuring device includes a signal-transmitting connection with the evaluation device, such that the evaluation device evaluates the output signals from the vibration sensor. By evaluating the output signals from the vibration sensor with respect to time, frequency, or location, it can be determined whether the test part is functioning without defects or whether functional defects are present, which are expressed in a deviation of a measured vibration pattern for the test part from a prescribed vibration pattern.

Another advantageous further development of the teaching of the invention provides that the balancing device has a device for establishing a reference rotational position for the rotor of the test part, such that a point of imbalance in the rotor is then identified relative to the reference rotational position. With this embodiment, first a reference rotational position for the rotor of the test part is established, for example by applying a mark to the rotor that can be optically detected by a sensor. Using the reference rotational position established as described above, the circumferential speed at which the rotor is rotating can then be determined. Using the output signals from the vibration sensor that is allocated to the balancing device, it can then be determined at which point on the periphery of the rotor (imbalance point) an imbalance exists.

The balancing of the test part can be accomplished in any way, for example by applying material, especially at least one balancing weight, to the outer circumference of the rotor. However, one particularly advantageous further development of the teaching of the invention provides that the balancing device includes a tool for removing material, which can be activated by control device, and with which material can be removed from the rotor of the test part to balance the rotor of the test part, at the balancing point established by the control device. In this embodiment, the automation of the balancing process is simplified, since the balancing is accomplished by removing material from the rotor of the test part, and not by applying a balancing weight, for example.

One advantageous further development of the above-described embodiment provides that the material-removing tool can be moved relative to the rotor, especially in its radial direction.

In order to construct the material-removing tool to be simple and cost-effective, one further development of the above-described embodiments provides that the material-removing tool includes a drill. In this, the drill can be a conventional cutting drill. However according to the invention the drill can also be a laser drill.

On the basis of relevant requirements the device of the invention can be equipped with additional testing devices configured for performing various tests on the test part. For example and especially, a testing device for testing a limited-slip differential can be provided, wherein especially the action of the differential in simulated driving along a curve, and the limited-slip action of the differential can be tested. Furthermore, a transmission test for testing the gear ratio of a transmission can also be provided. In addition, a measuring device for measuring rotary speeds, torques (frictional torques or drag torques), a rotary or circumferential backlash in gearing of the test part, or rotary transmission errors can be provided. A device for performing single flank testing can also be provided. Furthermore, it is possible according to the invention for the device to be equipped with test devices for testing mechanical or electrical actuators for the test part.

Below, the invention will be described in greater detail with reference to the attached, highly schematic set of drawings, in which embodiments of a device according to the invention are illustrated.

Relative terms such as left, right, up, and down are for convenience only and are not intended to be limiting.

BRIEF DESCRIPTION OF THE DRAWINGS

FIG. 3 is a highly schematic view from above of the device of FIG. 2, in the testing mode.

DETAILED DESCRIPTION OF THE INVENTION

Figure 1:
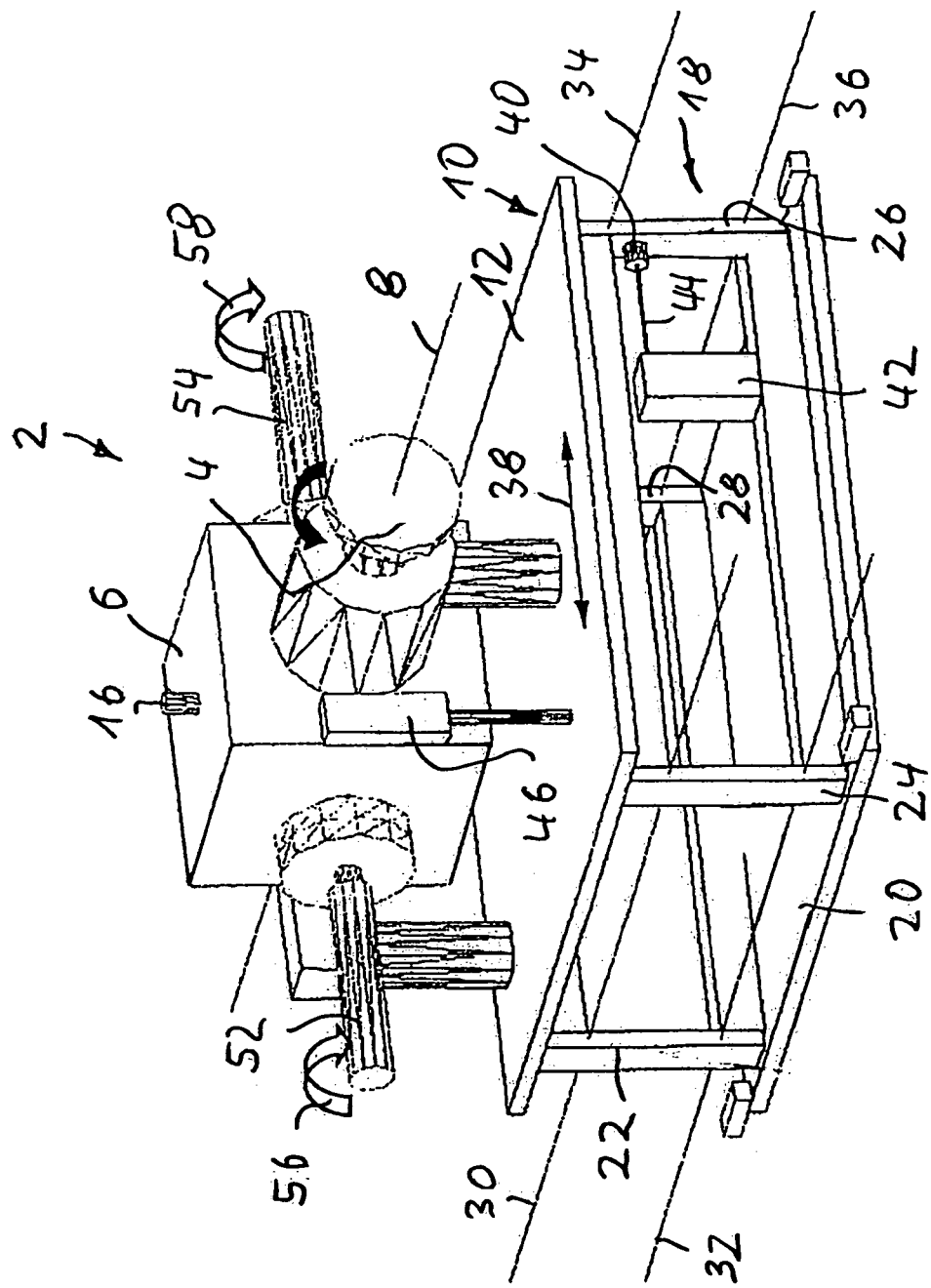
FIG. 1 is a highly schematic, perspective view of an embodiment of a device according to the invention, which is in the balancing mode.

FIG. 1 shows a highly schematic view of an embodiment of a balancing apparatus or device 2 according to the invention for performing vibration measurements, on a test part 6 that has a rotor 4, which in this embodiment is formed by a rear axle differential. The rotor 4 of the test part 6 is mounted on the test part such that it can rotate around a rotational axis 8.

The device 2 has a base structure 10, which in this embodiment has a table 12, on the upper surface of which a fastening device for the test part 6, which is not shown here, is mounted. In FIG. 3, which shows a view from above of the device 2, according to FIG. 1, the fastening device, which in this embodiment includes a clamping fixture 14 for holding the test part 6 in place, is visible.

The device 2 includes a vibration measuring device for measuring vibrations caused by a rotation of the rotor 4 of the test part 6, which in this embodiment includes a contacting vibration sensor 16 (first vibration sensor), which in this embodiment is attached directly to the test part 6 and thus includes a vibration-transmitting connection with it. The first vibration sensor 16 includes a signal-transmitting connection with evaluation device, which are not illustrated in the drawings, in such a way that the evaluation device evaluate the output signals from the vibration sensor in a manner that is described in greater detail further below.

According to the invention, the device 2 includes a rotor balancing device 18 for identifying and/or eliminating an imbalance in the rotor 4, which in this embodiment is integrated into the base structure 10 of the device 2.

The table 10 in this case is a component part of the balancing device 18 and is configured in this embodiment as a vibration table, which is connected to a base 20 of the base structure 10 such that it can vibrate. Further, in this embodiment four leaf springs 22, 24, 26, 28 are a component of the balancing device 18, wherein the vibration table 12 is supported on the base 20 via the leaf springs 22, 24, 26, 28, and thus is flexibly mounted on the base 20.

As can be seen in FIG. 1, the leaf springs 22, 24, 26, 28 in this embodiment are arranged at the corner points of an assumed rectangle. In the area at which the leaf spring 22 connects to the vibration table 12, a first articulation axis 30 is formed, and in the area at which the leaf spring 22 connects to the base 20 a second articulation axis 32 is formed, the two axes being parallel to one another. In a corresponding manner, two articulation axes are allocated to the leaf spring 24, which are coincident with the articulation axes 30, 32. In a corresponding manner, articulation axes 34, 36 are allocated to the leaf springs 26, 28, so that the vibration table 12 is mounted on the base 20 in a statically determinate manner, but such that it is flexibly mounted and capable of vibrating around the articulation axes 30, 32 or 34, 36 in a vibration direction that is parallel to its surface and in FIG. 1 is indicated by an arrow 38.

As can be seen from FIG. 1, the fastening device is arranged relative to the articulation axes 30, 32, 34, 36 such that the rotational axis 8 of the rotor 4 of the test part 6 is substantially parallel to the articulation axes 30, 32, 34, 36.

In this connection, the characteristic frequency of a vibration arrangement that is formed by the vibration table 12 and the leaf springs 22, 24, 26, 28 is chosen such that it is higher than a maximum vibration frequency of the test part 6, which is established from a maximum speed of its rotor 4 during the testing process. In this manner the vibration arrangement is prevented from becoming excited by the vibrations of the test part 6 with its characteristic frequency during the testing process.

A vibration sensor 40 (second vibration sensor) is allocated to the balancing device 18, which sensor includes a vibration-transmitting connection with the vibration table 12. In this embodiment, the second vibration sensor 40 is configured as a contacting force sensor, which is held in place on a fastening device 42 in the form of a supporting arm, which is arranged beneath the vibration table 12. In order to keep the second vibration sensor 40 in constant contact with the leaf spring 26 even in the event of a displacement of said spring, the second vibration sensor 40 is flexibly biased against the leaf spring 26 via a spring 44 that is arranged between the fastening device 42 and the second vibration sensor 40.

The second vibration sensor 40, which is allocated to the balancing device, includes a signal-transmitting connection with control device, not shown in the drawing, in such a way that the control device generate control signals configured to activate the balancing device 18 on the basis of the output signals from the second vibration sensor 40, for the purpose of balancing the test part 6, in a manner to be described in greater detail further below.

The balancing device 18 is further equipped with a device for establishing a reference rotational position for the rotor 4 of the test part 6, such that a point of imbalance on the rotor 4 is then identified relative to the reference rotational position. In this embodiment this device includes an optical sensor 46, the output of which is connected to the control device, and which scans an optical mark that is applied to the rotor 4 of the test part 6. By scanning the optical mark the rotational position of the rotor 4 can be determined. Accordingly, it can be determined by use of the control device at what point on the periphery of the rotor 4 a point of imbalance exists.

In this embodiment the balancing device 18 that is integrated into the device 2 is further equipped with a material-removing tool that is activated by the control device, and which in this embodiment includes a mechanical drill 48 (see FIG. 3). In FIG. 3 the drill 48 can be moved relative to the radial orientation of the rotor 4, in the direction of a double arrow 50, wherein to balance the rotor 4 using the drill 48, material can be removed from the rotor 4 of the test part 6 at a balancing point that is identified by the control device.

Output shafts 52, 54 of the test part 6 can be placed in rotation, as indicated in FIG. 1 by arrows 56, 58, for the purpose of rotating the rotor 4 during a balancing or testing process, by actuating motors that are not illustrated in FIG. 1.

Figure 2:
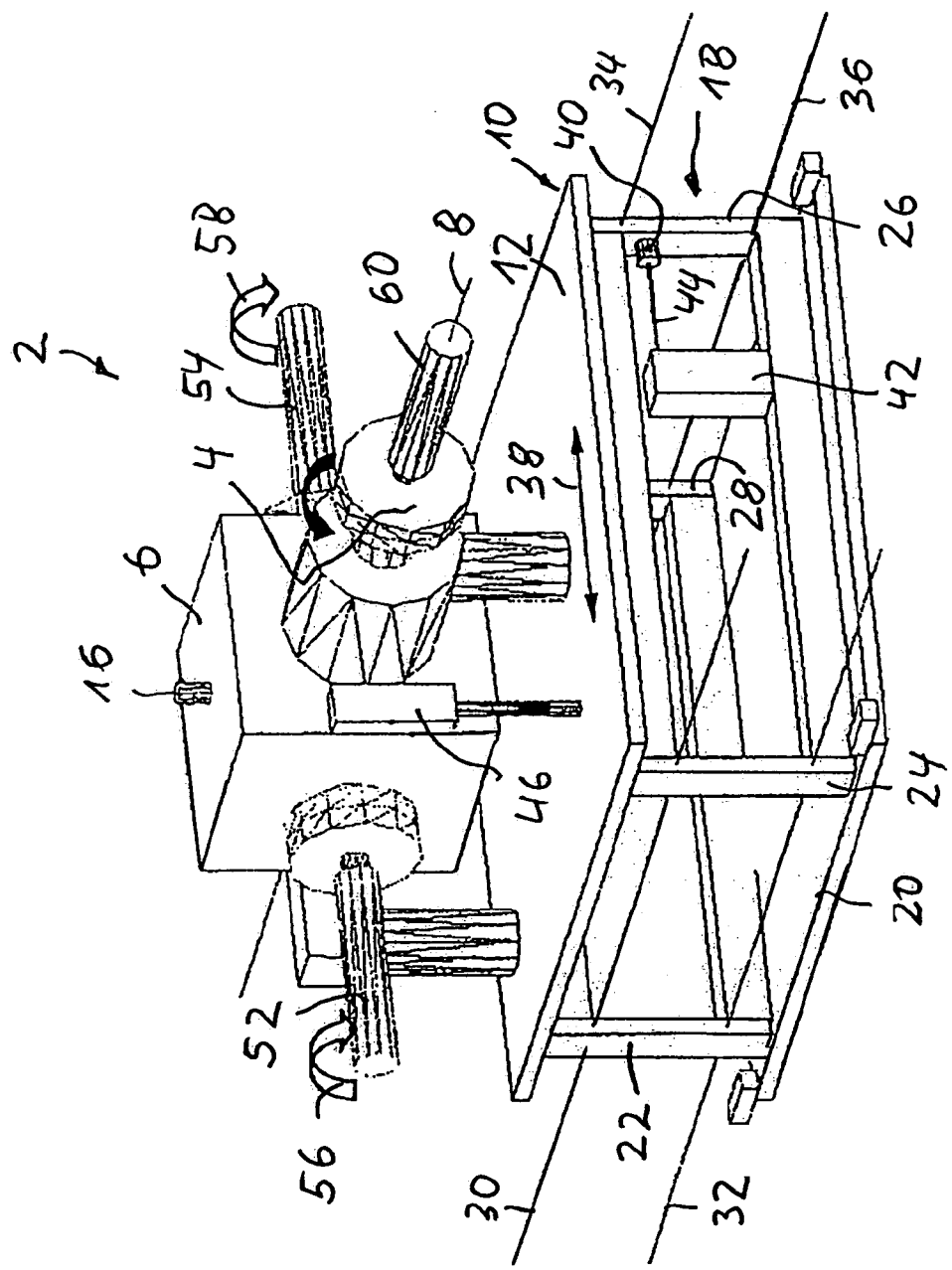
FIG. 2 is the device according to FIG. 1, shown in the same manner as in FIG. 1, in the testing mode.

FIG. 1 shows the device 2 in a balancing mode, in which the rotor 4 of the test part 6 is not loaded. In contrast, FIG. 2 shows the device 2 in a testing mode, in which a cardan shaft 60 is non-rotatably coupled to the rotor 4 of the test part 6 to simulate a load.

In FIG. 3, drive motors 62, 64 for the rotational actuation of the output shafts 52, 54 of the test part 6 are visible.

In this embodiment the device 2 is encompassed by a housing 66, which provides noise insulation and protection against contact.

The method of functioning of the device 2 according to the invention is as follows:

To perform vibration measurements on the test part 6, said part is placed on the table 12, for example by a manipulator or a robot, and is fixed in place on the table 12 by use of the clamping fixture 14. The control device then activate the drive motors 62, 64 such that they place the output shafts 52, 54 of the test part 6 in rotational actuation, in which the rotor 4 rotates around the rotational axis 8.

If an imbalance in the rotor 4 is present, it will place the vibration table 12 in vibration in the direction of vibration 38. These vibrations are recorded by the second vibration sensor 40, and the output signal from the second vibration sensor 40 is fed to the control device.

The control device evaluate the output signal from the second vibration sensor 40 with respect to time and/or frequency and/or location, in order to determine whether there is an imbalance in the rotor 4.

If the rotor 4 has no imbalance, or has an imbalance that is below prescribed limits, the balancing process can be ended and the control device can switch the device 2 from the balancing mode to a testing mode.

If, in contrast, there is an imbalance in the rotor 4, then the location of the imbalance in the circumferential direction of the rotor 4 relative to the reference rotational position, which is established by the optical sensor 46, is determined. The drive motors 62, 64 are then halted by the control device, and are subsequently activated such that the rotor 4 assumes a rotational position in which a balancing point, at which material must be removed in order to eliminate the imbalance, lies precisely opposite a drill bit 68 on the drill 48. The drill 48 is then advanced radially and placed against the rotor 4, with the drill bit 68 rotating, so that a balance hole is formed in the outer circumferential surface of the rotor 4, and in this manner material is removed. The radial depth of the balance hole in this process is dependent upon the amount of material that is necessary to compensate for the imbalance, which is determined beforehand by the control device.

If necessary based upon the relevant requirements, rather than one balance hole, multiple balance holes at various points can be formed along the periphery of the rotor 4.

Once the balancing process has been completed, the control device can switch the device to the testing mode, if the imbalance has been eliminated. If, in contrast, the imbalance has not yet been eliminated, or has not been sufficiently eliminated, the above-described balancing process can be repeated as many times as are required for the rotor 4 of the test part 6 to be balanced to the desired degree.

Upon completion of the balancing process, the control device switches the device 2 to a testing mode. In this testing mode first the cardan shaft 60 is coupled to the rotor 4 of the test part 6 for load simulation, as shown in FIG. 2. The drive motors 62, 64 then actuate the output shafts 52, 54 of the test part 6 such that the rotor 4, and with it the cardan shaft 60, rotates. In this state, in which the cardan shaft 60 is simulating a load, vibrations of the test part 6 are recorded via the first vibration sensor 16, and the output signals from the first vibration sensor 16 are fed to the evaluation device, which is not illustrated here. In this manner, the cardan shaft 60 can be supplied with additional torque via a further drive motor 70 (see FIG. 3). The evaluation device evaluates the output signals from the first vibration sensor 16 with respect to time and/or frequency and/or location, and using the resulting vibration pattern for the test part 6 it can be determined whether the test part 6 is functioning properly or whether defects exist in the test part 6, and if so, what they are.

Because the device 2 of the invention has an integrated balancing device 18, the test part 6 can remain continuously secured during the balancing process and the testing process in the fastening device that includes the clamping fixture 14. Thus the test part 6 needs to be removed only after the completion of all testing processes. The device 2 of the invention thus allows both balancing and vibration measuring to be performed on the test part 6, using one and the same device, in a simple and time-saving manner. Under the control of the control device, both the balancing and the subsequent vibration measurement can be implemented fully automatically.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Balancing device configured for balancing a test part having at least one rotor, the balancing device comprising:
   a) a base structure including a base;
   b) a table provided on the base, and a fastening device configured for fastening the test part, in use, mounted on the table, the table including a vibration table connected to the base of the base structure, and the vibration table being capable of vibrating;
   c) a vibration measuring sensor provided and configured for measuring vibrations caused by a rotation of the rotor of the test part, in use;
   d) a rotor balancing device provided, the rotor balancing device being arranged on the base structure, and the rotor balancing device being configured for at least one of identifying and eliminating an imbalance in the rotor of the test part, in use;
   e) a vibration measuring device being provided; and
   f) a control device being provided for controlling the vibration measuring device and the rotor balancing device, such that, in use, with the rotor balancing device in a balancing mode, the rotor balancing device can be switched by the control device to a testing mode, and in which testing mode the vibration measuring device can measure vibration caused by rotation of the rotor of the test part.

2. Device according to claim 1, wherein:
   a) the fastening device includes a clamping fixture for holding the test part in place, in use.

3. Device according to claim 1, wherein:
   a) the vibration table is pivotably connected for moving around at least one articulation axis relative to the base of the base structure.

4. Device according to claim 1, wherein:
a) the vibration measuring device has at least one vibration sensor, which is placeable in a vibration-transmitting connection with the test part, in use.

5. Device according to claim 1, wherein:
a) the vibration sensor includes a vibration-transmitting connection with the vibration table.

6. Device according to claim 5, wherein:
a) the vibration measuring sensor includes at least one common vibration sensor allocated to the vibration measuring device and the rotor balancing device.

7. Device according to claim 1, wherein:
a) the vibration sensor is a contactless sensor.

8. Device according to claim 7, wherein:
a) the vibration sensor is configured as a laser vibrometer.

9. Device according to claim 7, wherein:
a) the vibration sensor is configured as an acoustic sensor.

10. Device according to claim 1, wherein:
a) the vibration sensor is a contacting sensor.

11. Device according to claims 10, wherein:
a) the vibration sensor can be or is placed in contact with the test part, in use.

12. Device according to claim 11, wherein: a) the vibration sensor is includes an acceleration sensor.

13. Device according to claim 1, wherein:
a) the vibration measuring sensor includes at least one separate vibration sensor allocated to both the vibration measuring device and the rotor balancing device.

14. Device according to claim 1, wherein:
a) the control device is provided for automatic activation of one of the vibration measuring device, the rotor balancing device, and an evaluation device for evaluating output signals from the vibration measuring device.

15. Device according to claim 14, wherein:
a) after a rotor of a test part is balanced by the rotor balancing device, in use, with the device in a balancing mode, the device can be automatically switched by the control device to a testing mode, in which testing mode the vibration measuring device can measure vibrations caused by a rotation of the rotor of the test part.

16. Device according to claim 14, wherein:
a) the vibration sensor is allocated to the rotor balancing device, the vibration sensor including a signal-transmitting connection with the control device, such that, in order to balance the rotor of the test part, in use, the control device generates control signals selected for activating the rotor balancing device on the basis of output signals from the vibration sensor allocated to the rotor balancing device.

17. Device according to claim 14, wherein:
a) the vibration sensor allocated to the vibration measuring device includes a signal-transmitting connection with the evaluation device such that the evaluation device evaluates output signals from the vibration sensor.

18. Device according to claim 14, wherein:
a) the rotor balancing device includes a material-removing tool that can be activated by the control device, and by which material can be removed from the rotor of the test part, in use, in order to balance the rotor of the test part at a balancing point identified by the rotor control device.

19. Device according to claim 18, wherein:
a) the material-removing tool can be moved relative to the rotor, in use.

20. Device according to claim 18, wherein: a) the material-removing tool includes a drill.

21. Device according to claim 18, wherein:
a) the material-removing tool can be moved relative to the rotor, in the radial direction of the rotor, in use.

22. Device according to claim 1, wherein:
a) the rotor balancing device has a device for establishing a reference rotational position for the rotor of the test part, in use, such that a point of imbalance on the rotor is identified relative to the reference rotational position.

23. Device according to claim 1, wherein:
a) the device is configured for performing vibration measurements on a test part transmission having at least one rotor.

24. Device according to claim 1, wherein:
a) the vibration table is elastically and resiliently mounted on the base via a spring device.

25. Device according to claim 24, wherein:
a) the spring device includes at least one leaf spring;
b) the at least one leaf spring includes an articulation axis formed in each area in which the at least one leaf spring is connected to the table and to the base.

26. Device according to claim 25, wherein:
a) the at least one leaf spring includes four leaf springs spaced relative to one another, and substantially arranged at corners of a rectangle.

27. Device according to claim 25, wherein:
a) the fastening device is arranged relative to the articulation axis such that when a test part is placed in the fastening device, in use, the rotational axis of the rotor of the test part is substantially parallel to the articulation axis.

28. Device according to claim 24, wherein:
a) a characteristic frequency of a vibration arrangement that is formed by the vibration table and the spring device is chosen such that it is higher than a maximum vibration frequency for the test part, in use, which is defined by a maximum speed of its rotor during the testing process.

29. Device according to claim 24, wherein:
a) the spring device includes a leaf spring; and
b) the vibration sensor is supported against the leaf spring, in use.

30. Device according to claim 29, wherein:
a) the vibration sensor is held in place on a fastening device arranged beneath the vibration table.

31. Device according to claim 29, wherein:
a) the vibration sensor abuts a spring of the spring device.

* * * * *